United States Patent Office 2,759,853
Patented Aug. 21, 1956

2,759,853

PROCESS FOR MAKING COATED PAPER

John W. Smith, Elsmere, Del., assignor to Hercules Powder Company, Wilmington, Del., a corporation of Delaware No Drawing. Application August 3, 1951,
Serial No. 240,277

11 Claims. (Cl. 117—157)

This invention relates to a coated paper and process useful therefor.

In U. S. 2,502,783, issued to Donald Robert Erickson, the use of alkali-soluble hydroxyalkyl cellulose, specifically hydroxyethyl cellulose, as an adhesive for binding pigmented coatings to paper is disclosed, together with a novel process for applying the coatings to paper. This process consists of preparing a coating color of an alkaline dispersion of the hydroxyethyl cellulose and coating pigment, applying the mixture to paper, and immediately contacting the coated surface with a setting agent. The setting agent gels the coating into a film by precipitating the hydroxyethyl cellulose and neutralizes the excess alkali. The excess setting agent is squeezed out and the coated sheet is dried.

Among the advantages listed by Erickson for this coated paper are that such a paper is highly resistant to rub and pick, is highly flexible, free from bubbles, has a long life, receives ink with an improved lay, and is free from spots. Furthermore, on such a coated paper printing inks dry more quickly than on ordinary coated papers. The coating is also said to be firmly anchored to the base stock and to be water-insoluble.

Despite these advantages set forth by Erickson, the use of alkali-soluble hydroxyethyl cellulose as an adhesive in paper coatings has not been accepted by the art. One of the reasons for this lack of acceptance is the high viscosities of practical grades of hydroxyethyl cellulose whereas for the greatest versatility and ease of handling on high-speed paper coating machines, it is desirable to have low viscosity colors at high total solids content. Another reason is the high reagent cost due to the high degree of substitution required to obtain an hydroxyethyl cellulose of proper solubility characteristics.

In describing the invention, it is necessary to refer to cellulose derivatives in terms of their degree of substitution and degree of polymerization. As used throughout this specification, the term "degree of substitution" means the number of substituent groups substituted on each anhydroglucose unit. The term "degree of polymerization" means the average number of anhydroglucose units linked together to form the cellulose chain.

At a given degree of substitution the bonding strength of the hydroxyethyl cellulose used as an adhesive increases rapidly with increasing degree of polymerization up to a critical range beyond which there is little change. The viscosity of the adhesive and of the coating colors made from it also increases with increasing degree of polymerization. In fact, because a detailed physical study of each sample is impractical, the viscosity usually furnishes the only inference regarding its degree of polymerization. The degree of polymerization, and hence the viscosity, must therefore be adjusted to balance bonding strength and operability. Grades of hydroxyethyl cellulose which are useful from the standpoint of providing practical bonding strengths have Brookfield viscosities of about 5000 cps. to about 7000 cps. at 7.6% concentration in 7% sodium hydroxide. Coating colors prepared with such adhesives have viscosities of well over 300 cps. These high viscosities greatly decrease the utility of these adhesives in high-speed paper coating machines.

Now in accordance with the present invention there may be prepared paper coating compositions using a new adhesive which has all of the advantages of the hydroxyethyl cellulose, together with a much lower viscosity. This new adhesive is alkali-soluble sulfoalkyl cellulose, more particularly, sulfoethyl celluose. In addition to greaty improved viscosity characteristics, this adhesive at comparable solubility characteristics of hydroxyethyl cellulose has vastly lower degrees of substitution. Thus, a reduction in quantity of reagent necessary to prepare a satisfactory derivative is possible. This means a substantial reduction in the cost of the adhesive. Alternatively, a sulfoethyl cellulose of higher degree of substitution and corresponding solubility in lower concentration of alkali may be used, and such a derivative will operate satisfactorily in the coating process. For example, a sulfoethyl cellulose which is soluble in 2% to 3% sodium hydroxide but water-insoluble may be used. It permits reducing the quantity of sodium hydroxide in the coating color. The lower caustic content in turn decreases the amount of acidic gelation agent consumed in neutralizing the excess caustic and thus effects a further economy.

Yet another advantage is that a paper coated with a color containing sulfoethyl cellulose as a binder has a much higher gloss when calendered than an equivalent paper having hydroxyethyl cellulose as a coating binder calendered at the same stack pressure. Alternatively, equivalent gloss can be obtained at about half the stack pressure needed for the paper having hydroxyethyl cellulose as a coating binder. This lower stack pressure for calendering paper having sulfoethyl cellulose as a coating binder would reduce maintenance on the calendering machines.

Sulfoethyl cellulose with a degree of substitution of about 0.12 has the same solubility characteristics as hydroxyethyl cellulose with a degree of substitution of 0.35. Moreover, sulfoethyl cellulose becomes water-soluble at a degree of substitution of 0.3, whereas hydroxyethyl cellulose does not become water-soluble until it has a degree of substitution of about 1.0. Thus, a degree of substitution of as low as 0.28 gives a sulfoethyl cellulose which is soluble in as little as 2 or 3% sodium hydroxide.

In carrying out the invention an alkaline dispersion of a coating pigment and a sulfoalkyl cellulose such as sulfoethyl cellulose or sulfopropyl cellulose which is insoluble in water but soluble in aqueous alkali is prepared. This coating color is applied to a fibrous cellulosic web by any suitable coating machine. The coated surface is immediately contacted with an acidic gelation agent. The acidic gelation agent precipitates or gels the coating into a film of contiguous pigment particles bound together by the sulfoalkyl cellulose and removes the alkali either by converting the hydroxyl ion to water or precipitating it from solution. The excess acidic gelation agent is squeezed out and the coated sheet is dried.

Alternatively, the reverse process may be employed for applying the coatings. This process comprises impregnating a cellulosic web with an aqueous solution of an acidic gelation agent for sulfoalkyl cellulose, preferably drying the impregnated paper although this step is not absolutely necessary, covering a face of the paper with a continuous coating of pigment dispersed in a solution in aqueous sodium hydroxide of sulfoalkyl cellulose, and finally drying the coated paper.

As will be seen from the following examples, a sulfoethyl cellulose of comparable bonding strength to a given hydroxyethyl cellulose has very substantially less viscosity. The following examples are presented in illustration but not in limitation of the invention. All parts are by weight unless otherwise specified.

Example 1

One hundred parts of Georgia clay were dispersed in 53.6 parts water and 0.3 part sodium hydroxide. Four parts sodium hydroxide dissolved in 27.1 parts water were added. Six parts of the sodium salt of a sulfoethyl cellulose having a degree of substitution of 0.12 were dispersed in a solution of 3.7 parts sodium hydroxide in 70.3 parts of water. The sulfoethyl cellulose solution was added slowly to the rapidly agitated clay slurry. The resulting color had an effective solid content of 40% dispersed in a 5% sodium hydroxide solution. The coating color viscosity was 105 cps.; the viscosity of the sulfoethyl cellulose solution was 213 cps.

The coating was applied to a commercial coating body-stock paper with a knife coater using a dry weight of coating of 12 lb. per 3000 sq. ft. of surface. The coated surface was immediately contacted with a 25% water solution of monosodium phosphate which gelled the sulfoethyl cellulose and neutralized the sodium hydroxide. The excess acidic gelation agent was then squeezed from the surface by pressing the paper between rolls under pressure. The paper was then dried at 105° C., conditioned 16 hours at 50% relative humidity and 74° F., supercalendered on a laboratory calender stack, and reconditioned as before. The maximum printing speed passed without picking was 4 speed-ranger units.

Example 2

Same as Example 1 except hydroxyethyl cellulose having a degree of substitution of 0.37 was used instead of the sulfoethyl cellulose specified in Example 1. The coating color viscosity was 375 cps. and the viscosity of the hydroxyethyl cellulose solution was 7503 cps. The maximum printing speed passed without picking was 4.5 speed-ranger units.

Example 3

Three hundred parts of the sodium salt of a sulfoethyl cellulose having a degree of substitution of 0.21 were slurried with 3025 parts of water. To this were added 185 parts of sodium hydroxide dissolved in 490 parts of water. The finished sulfoethyl cellulose solution contained 7.5% sulfoethyl cellulose dissolved in a 5% sodium hydroxide solution. Five thousand parts of Georgia clay were mixed with 50 parts of calcium hydroxide. The sulfoethyl cellulose solution was slowly added; 53 parts of sodium hydroxide were dissolved in 3047 parts of water and added. The final color contained 6 parts of sulfoethyl cellulose per 100 parts of clay. The effective solid content was 43.8% dispersed in a 3.5% sodium hydroxide solution. The viscosity of the color was 109 cps.

The color was applied to a coating body-stock paper using an air knife applicator on an experimental continuous web coater. The wet coating was contacted with 25% sodium acid sulfate and the paper was dried on a drum drier. The coating weight was 13.5 lb. per 3000 sq. ft. of surface. The paper was conditioned as in Example 1. One lot of the paper was then calendered at 8000 lb. stack pressure at 180° F. while the other lot of paper was calendered at 4000 lb. stack pressure at 180° F. After the calendering both lots were reconditioned as in Example 1. The sample calendered at 8000 lb. stack pressure had a bonding strength of 4 speed-ranger units, a GE brightness of 77.3 and a Hunter 75° gloss of 71. A gloss of 51 was obtained when only 4000 lb. stack pressure was used.

Example 4

A coating color was prepared as in Example 3 except that an hydroxyethyl cellulose having a degree of substitution of 0.37 was used instead of a sodium sulfoethyl cellulose, 7% sodium hydroxide was needed to disperse the hydroxyethyl cellulose instead of 5% for the sodium sulfoethyl cellulose, and the finished color had an effective solid content of only 30%. The solvent in the finished color was 5% sodium hydroxide solution and the viscosity of the color was 96 cps.

This color was applied to give a coating weight of 13.9 lbs. per 3000 sq. ft. to the same body-stock and in the same way as in Example 3. The paper was conditioned as in Example 1 and then calendered at 8000 lb. stack pressure and a temperature of 180° F. The paper was then reconditioned as in Example 1. The sample calendered at 8000 lb. pressure and 180° F., had a bonding strength of 3.5 speed-ranger units, a GE brightness of 75.1, and a Hunter 75° gloss of only 55.2.

The viscosities of the cellulose derivative solutions were measured at 25° C. using a Brookfield viscometer with a No. 4 spindle at 60 R. P. M. The viscosities of the coating colors were measured on a Hercules Hi-Shear viscometer at 1100 R. P. M. at 25° C.

The pick resistance referred to in the examples was obtained by means of a pick tester consisting of an inking roller, an impression cylinder and a backing cylinder which also carries the sample being tested. The action simulates that of a rotary press but the speed of the press can be varied by a speed-ranger variable speed transmission. In practice the tack of the ink and all other controllable test conditions are standardized, and the maximum speed is determined at which the paper can be printed without picking. The higher the speed-ranger number the greater is the pick resistance or the bonding strength of the adhesive.

The new coating color composition used in accordance with this invention comprises an aqueous mixture of a pigment with a binding material and sufficient caustic soda to dissolve the binding material, the binding material being an alkali-soluble salt of a cellulose alkyl sulfonic acid ether. The cellulose alkyl sulfonic acid ether salts which are suitable are those which are insoluble in water but are soluble in a solution of sodium hydroxide in water. Among the salts which are operable in this invention are the potassium, ammonium, barium and calcium salts of a cellulose alkyl sulfonic acid ether. The sodium salts of a cellulose alkyl sulfonic acid ether are preferred. More particularly, the salts suitable are those which are soluble in 2 to 12% sodium hydroxide but insoluble in water and more dilute sodium hydroxide solutions. The cellulose ethyl β-sulfonic acid ether salts having these solubility characteristics will have a degree of substitution of from about 0.05 to about 0.28. The preferred cellulosic salt to employ is one which is soluble in 2 to 4% sodium hydroxide but insoluble in water and more dilute sodium hydroxide solutions. The cellulose ethyl β-sulfonic acid ether salts having these preferred solubility characteristics will have a degree of substitution of from about 0.15 to about 0.28.

Although any sulfoalkyl cellulose, such as sulfopropyl cellulose or sulfobutyl cellulose, which is soluble in sodium hydroxide solutions of the requisite concentrations is operable, it is preferred to use sulfoethyl cellulose.

By the term "sulfoalkyl cellulose" is meant an alkali-soluble salt of a cellulose alkyl sulfonic acid ether. Similarly, by the term "sulfoethyl cellulose" is meant an alkali-soluble salt of cellulose ethyl β-sulfonic acid ether.

The pigment material which is utilized in the coating color comprises one of the conventional paper coating fillers such as, for example, a pulverized clay or the like. For higher quality or special types of paper there may be substituted therefor other known pigment materials such as, for example, calcium carbonate, titanium dioxide, satin white or other coating pigments alone or, preferably, with a clay base. The modification of the coating color using these materials will be within the knowledge of those skilled in the art, and it is to be understood that the pigment material as contemplated herein includes any or all of these materials.

The amount of the binder in the coating color is maintained between about 3 and about 15% based on the weight of the pigment and preferably between 6 and 8%. In general the binder content will depend on the grade and end use of the paper being prepared.

Any acidic gelation agent for sulfoalkyl cellulose may be employed in accordance with this invention. As soon as the acidic gelation agent is contacted with the coating, the acidic gelation agent performs the dual function of gelling or salting out the sulfoalkyl cellulose and neutralizing the sodium hydroxide present in the coating. The ability of the acidic gelation agent to gel the sulfoalkyl cellulose is directly dependent upon the fundamental nature of its constituent ions and in particular upon their affinity for water molecules. The ability of the acidic gelation agent to neutralize the sodium hydroxide in the coating is dependent upon its tendency to remove hydroxyl ions from solution with the formation of water or relatively insoluble hydroxides. The term "acidic" as used in the expression "acidic gelation agent" is accordingly used in the sense of having the ability to react with hydroxyl ions and thereby removing hydroxyl ions from solution. Most of the acidic gelation agents useful in accordance with this invention have in aqueous solution a pH below 7.0. However, it is not necessary that they possess this characteristic. It is only necessary that they have the ability to react with hydroxyl ions and thereby remove such ions from solution. In view of the foregoing it will be seen that to be effective for the purposes of this invention the acidic precipitating agent for sulfoalkyl cellulose must perform the functions: (1) gelling or salting out the sulfoalkyl cellulose and (2) neutralizing the sodium hydroxide.

The following acidic gelation agents may be used in accordance with this invention: acid salts of alkali metals such as $NaH_2PO_4$, $Na_2HPO_4$, $NaHSO_4$, $KHSO_4$, etc.; salts of strong acids and relatively weak bases such as $Al_2(SO_4)_3$, $MgCl_2$, $MgSO_4$, $Mg(NO_3)_2$, $CaCl_2$, etc.; ammonium salts such as $(NH_4)_2SO_4$, $NH_4Cl$, $(NH_4)_2CO_3$, etc. It should be appreciated that this is not an exclusive list of acidic gelation agents which are useful in carrying out this invention, but other such agents which are known to the art to effect gelation of sulfoalkyl cellulose or other cellulose derivatives when in solution in aqueous sodium hydroxide may be employed. The alkali metal acid salts besides gelling the sulfoalkyl cellulose furnish a hydrogen ion which reacts with the hydroxyl ion of the sodium hydroxide to form water, thereby neutralizing caustic soda. The salts of strong acids and relatively weak bases besides gelling the sulfoalkyl cellulose furnish ions which combine with the hydroxyl ion of the sodium hydroxide to form relatively insoluble compounds such as hydrated aluminum oxide in the case of $Al_2(SO_4)_3$, magnesium hydroxide in the case of $MgSO_4$, etc., thereby neutralizing the caustic soda. The ammonium salts besides gelling the sulfoalkyl cellulose furnish ammonium ions which react with the hydroxyl ion of the sodium hydroxide, and ammonia is thereafter eliminated either by heating or upon standing.

The acidic gelation agent is applied to the paper in the form of an aqueous solution, preferably of 10 to 30% concentration. Although the concentration of the solution is not critical, it must be high enough to gel the sulfoalkyl cellulose adequately. In addition, the acidic reaction of the acidic gelation agent should be adjusted to leave the coated paper in the pH range of about 5 to 8 in the time allotted for neutralization. In case the reverse coating process is used it may be desired to incorporate a wetting agent in the aqueous solution to facilitate impregnation of the base stock.

Any suitable coating machine which will not be damaged by the sodium hydroxide may be used. The machine may be a shaft coater, a roll coater, a knife coater, an air brush coater or a gravure or letter press type.

The acidic gelation agent may be heated to 150° to 200° F. to speed up the reaction, but this step is not necessary. The coated sheet may be steamed to speed up precipitation of the binder and may also be given a hot water wash to remove excess electrolytes, although these steps are not necessary.

The coated paper may be dried by any suitable means, but it is preferred to dry the paper in contact with a drum drier or a series of paper machine drier rolls. This drying under tension minimizes cockle from shrinkage.

At equal concentrations of binder and using the same concentration of NaOH, the adhesives used in this invention give coating colors with as little as one-fourth or less the viscosity of colors using hydroxyethyl cellulose as a binder. This results in greatly increased utility of these colors over those using hydroxyethyl cellulose as adhesives in high speed paper coating machines. Further, the much lower degrees of substitution needed to give a sulfoethyl cellulose of the proper solubility characteristics permits substantial savings in reagent costs as compared to the prior art hydroxyethyl cellulose. Also, at equal calendering pressures the coatings laid down from these colors have vastly more gloss than coatings laid down from colors using hydroxyethyl cellulose as adhesives. Moreover, the coatings laid down from these colors are fully equal in pick and rub resistance and other properties to those coatings laid down from colors using hydroxyethyl cellulose as adhesives.

Unpigmented films of the alkali-soluble, water-insoluble sulfoalkyl cellulose of the instant invention may be used to prepare papers that are oil-, grease-, organic solvent-, and aromatic odor- and gas-impenetrable.

What I claim and desire to protect by Letters Patent is:

1. The process for preparing a coated paper comprising applying to the surface of a web of cellulosic fibers a coating consisting essentially of 100 parts of pigment dispersed in a solution, in aqueous sodium hydroxide, of from 5 to 15 parts of binder consisting essentially of a water-insoluble salt of a cellulose alkyl sulfonic acid ether, said coating containing at least about 40% solids and immediately after application of said coating precipitating said salt of a cellulose alkyl sulfonic acid ether from solution by immediately contacting said coating with a water solution of an acidic gelation agent for a water-insoluble salt of a cellulose alkyl sulfonic acid ether, and then drying the paper.

2. The process for preparing a coated paper comprising applying to the surface of a web of cellulosic fibers a coating consisting essentially of 100 parts of pigment dispersed in a solution, in aqueous sodium hydroxide, of from 5 to 15 parts of binder consisting essentially of a water-insoluble salt of a cellulose ethyl $\beta$-sulfonic acid ether, said coating containing at least about 40% solids and immediately after application of said coating precipitating said salt of a cellulose ethyl $\beta$-sulfonic acid ether from solution by immediately contacting said coating with a water solution of an acidic gelation agent for a water-insoluble salt of a cellulose ethyl $\beta$-sulfonic acid ether, and then drying the paper.

3. The process for preparing a coated paper comprising applying to the surface of a web of cellulosic fibers a coating consisting essentially of 100 parts of pigment dispersed in a solution, in aqueous sodium hydroxide, of from 5 to 15 parts of binder consisting essentially of a water-insoluble salt of a cellulose alkyl sulfonic acid ether, said coating containing at least about 40% solids and immediately after application of said coating precipitating said salt of a cellulose alkyl sulfonic acid ether from solution by immediately contacting said coating with a water solution of an acidic gelation agent for a water-insoluble salt of a cellulose alkyl sulfonic acid ether, and then drying the paper with the coating in contact with a smooth surface.

4. The process for preparing a coated paper comprising applying to the surface of a web of cellulosic fibers a coating consisting essentially of 100 parts of pigment dispersed in a solution, in aqueous sodium hydroxide, of from 5 to 15 parts of binder consisting essentially of a water-insoluble salt of a cellulose ethyl $\beta$-sulfonic acid ether, said coating containing at least about 40% solids and immediately after application of said coating precipitating said salt of a cellulose ethyl β-sulfonic acid ether from solution by immediately contacting said coating with a water solution of an acidic gelation agent for a water-insoluble salt of a cellulose ethyl β-sulfonic acid ether, and then drying the paper with the coating in contact with a smooth surface.

5. The process for preparing a coated paper comprising applying to the surface of a web of cellulosic fibers a coating comprising essentially 100 parts of pigment dispersed in a solution, in aqueous sodium hydroxide, of from 5 to 15 parts of binder consisting essentially of a water-insoluble salt of a cellulose ethyl β-sulfonic acid ether, said coating containing at least about 40% solids and immediately after application of said coating precipitating said salt of a cellulose ethyl β-sulfonic acid ether from solution by immediately contacting said coating with a water solution of aluminum sulfate, and then drying the paper.

6. The process for preparing a coated paper comprising applying to the surface of a web of cellulosic fibers a coating comprising essentially 100 parts of pigment dispersed in a solution, in aqueous sodium hydroxide, of from 5 to 15 parts of binder consisting essentially of a water-insoluble salt of a cellulose ethyl β-sulfonic acid ether, said coating containing at least about 40% solids and immediately after application of said coating precipitating said salt of a cellulose ethyl β-sulfonic acid ether from solution by immediately contacting said coating with a water solution of monosodium phosphate, and then drying the paper.

7. The process for preparing a coated paper comprising applying to the surface of a web of cellulosic fibers a coating comprising essentially 100 parts of pigment dispersed in a solution, in aqueous sodium hydroxide, of from 5 to 15 parts of binder consisting essentially of a water-insoluble salt of a cellulose ethyl β-sulfonic acid ether, said coating containing at least about 40% solids and immediately after application of said coating precipitating said salt of a cellulose ethyl β-sulfonic acid ether from solution by immediately contacting said coating with a water solution of magnesium chloride, and then drying the paper.

8. The process for preparing a coated paper comprising applying to the surface of a web of cellulosic fibers a coating comprising essentially 100 parts of pigment dispersed in a solution, in aqueous sodium hydroxide, of from 5 to 15 parts of binder consisting essentially of a water-insoluble salt of a cellulose ethyl β-sulfonic acid ether, said coating containing at least about 40% solids and immediately after application of said coating precipitating said salt of a cellulose ethyl β-sulfonic acid ether from solution by immediately contacting said coating with a water solution of calcium chloride, and then drying the paper.

9. The process for preparing a coated paper comprising applying to the surface of a web of cellulosic fibers a coating comprising essentially 100 parts of pigment dispersed in a solution, in aqueous sodium hydroxide, of from 5 to 15 parts of binder consisting essentially of a water-insoluble salt of a cellulose ethyl β-sulfonic acid ether, said coating containing at least about 40% solids and immediately after application of said coating precipitating said salt of a cellulose ethyl β-sulfonic acid ether from solution by immediately contacting said coating with a water solution of sodium acid sulfate, and then drying the paper.

10. The process for preparing a coated paper comprising impregnating a web of cellulosic fibers with an aqueous solution of an acidic gelation agent for a water-insoluble salt of a cellulose alkyl sulfonic acid ether, covering a face of the paper with a coating consisting essentially of 100 parts of pigment dispersed in a solution in aqueous sodium hydroxide of from 5 to 15 parts of binder consisting essentially of a water-insoluble salt of a cellulose alkyl sulfonic acid ether, said coating containing at least about 40% solids, the salt of a cellulose alkyl sulfonic acid ether in said coating being immediately precipitated upon application to the surface of the paper by the action of the acidic gelation agent to form on the paper a film of contiguous pigment particles bound together by said salt of a cellulose alkyl sulfonic acid ether, and then drying the paper.

11. The process for preparing a coated paper comprising applying to the surface of a web of cellulosic fibers a coating consisting essentially of 100 parts of pigment dispersed in a solution, in aqueous sodium hydroxide, of from 5–15 parts of binder consisting essentially of a water-insoluble salt of a cellulose alkyl sulfonic acid ether, said coating containing at least about 40% solids precipitating said salt of a cellulose alkyl sulfonic acid ether from solution with an acidic gelation agent for a water-insoluble salt of a cellulose alkyl sulfonic acid ether, and then drying the paper.

References Cited in the file of this patent

UNITED STATES PATENTS

| | | |
|---|---|---|
| 1,908,341 | Gentile | May 9, 1933 |
| 2,107,852 | Bolton | Feb. 8, 1938 |
| 2,319,957 | Speicher | May 25, 1943 |
| 2,422,572 | Lilienfeld | June 17, 1947 |
| 2,502,782 | Erickson | Apr. 4, 1950 |
| 2,502,783 | Erickson | Apr. 4, 1950 |
| 2,524,915 | Lippert | Oct. 10, 1950 |
| 2,568,288 | Montgomery | Sept. 18, 1951 |

FOREIGN PATENTS

| | | |
|---|---|---|
| 480,679 | Great Britain | of 1936 |
| 856,012 | France | of 1940 |